United States Patent Office 3,311,539
Patented Mar. 28, 1967

3,311,539
METHOD OF TREATING TRAUMATIZED
NERVES
Floyd S. Eberts, Jr., Kalamazoo, Mich., assignor to The Upjohn Company, Kalamazoo, Mich., a corporation of Delaware
No Drawing. Filed Feb. 14, 1964, Ser. No. 344,835
1 Claim. (Cl. 167—65)

This application is a continuation-in-part of my applications Ser. No. 781,855, filed Dec. 22, 1958, Ser. No. 76,151, filed Dec. 16, 1960, and Ser. No. 191,417, filed May 1, 1962, all of which are now abandoned.

This invention relates to therapeutic compositions, and more particularly to therapeutic compositions of 2-amino-1,3,3-tricyano-2-propene.

The invention provides therapeutic compositions consisting essentially of 2-amino-1,3,3-tricyano-2-propene and a pharmaceutical carrier. The invention provides also methods of treatment therewith.

2-amino-1,3,3-tricyano-2-propene has the structural formula $(CN)_2C=C(NH_2)CH_2CN$. In purified form it is a white crystalline compound with a melting point of about 172° C. It can be prepared in accordance with the methods of U.S. Patent No. 2,719,861.

The modes contemplated by the inventor of carrying out his invention include compositions for oral administration, compositions for injection, and methods of administration thereof to animals.

The compositions of the present invention are preferably presented for administration in unit dosage form as tablets, pills, capsules, powders, granules, sterile parenteral solutions or suspensions and the like. For preparing solid compositions such as tablets, the principal active ingredient is mixed with conventional tableting ingredients such as corn starch, lactose, sucrose, sorbitol, talc, stearic acid, magnesium stearate, dicalcium phosphate, gums, and functionally similar materials as pharmaceutical diluents or carriers. The tablets or pills of the novel composition can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate, and the like. A particularly advantageous enteric coating comprises a styrene-maleic acid copolymer together with known materials contributing to the enteric properties of the coating.

The liquid forms in which the novel composition of the present invention may be incorporated for administration include aqueous solutions, suitably flavored syrups, aqueous or oil suspensions, flavored emulsions with edible oils such as cottonseed oil, sesame oil, coconut oil, peanut oil and the like, as well as elixirs and similar pharmaceutical vehicles. Suitable dispersing or suspending agents for aqueous suspensions include synthetic and natural gums such as tragacanth, acacia, alginate, dextran, sodium carboxymethylcellulose, methylcellulose, polyvinylpyrrolidone, gelatin and the like. A particularly useful suspending vehicle is prepared from a combination of sodium carboxymethylcellulose and polyvinylpyrrolidone as disclosed in U.S. Patent No. 2,897,120.

In aqueous preparations, it is advantageous to include antioxidants such as about 0.1% of ascorbic acid and about 0.1% of a sulfur-containing reducing agent of the class consisting of sulfur dioxide, sulfur-containing acids which are capable of yielding sulfur dioxide, soluble non-toxic salts of such sulfur-containing acids and aldehyde addition products thereof.

In addition to the administration of 2-amino-1,3,3-tricyano-2-propene as the essential active ingredient of compositions for the treatment of the conditions described herein, the said compound of the novel compositions can be included with other types of compounds to obtain advantageous combinations of properties. Such combinations include 2-amino-1,3,3-tricyano-2-propene together with tranquilizers such as reserpine, chlorpromazine, promethazine, benactyzine, ectylurea, imipramine and meprobamate; sedatives such as phenobarbital, pentobarbital and amobarbital; analgesics such as aspirin, phenacetin, salicylamide and N-acetyl-p-aminophenol; vitamins such as A, D, $B_1$, $B_2$, $B_6$, $B_{12}$, pantothenate, ascorbic acid, folic acid and nicotinamide; and hormones such as estradiol and methyltestosterone.

The term dosage unit form as used in the specification and claim refers to physically discrete units suitable as unitary dosages for mammalian subjects, each containing a predetermined quantity of active material calculated to produce the desired therapeutic effect in association with the required pharmaceutical diluent, carrier or vehicle. The specifications for the novel dosage unit forms of this invention are dictated by and directly dependent on (a) the unique characteristics of the active material and the particular therapeutic effect to be achieved, and (b) the limitations inherent in the art of compounding such an active material for therapeutic use in animals, as disclosed in detail in this specification, these being features of the present invention. Examples of suitable oral dosage unit forms in accord with this invention are tablets, capsules, pills, powder packets, granules, wafers, cachets, teaspoonfuls, tablespoonfuls, dropperfuls, segregated multiples of any of the foregoing, and other forms as hereinbefore described.

The active ingredient of the novel compositions possesses striking pharmacologic activity which indicates its usefulness in the treatment of various afflictions of animals.

By use of the ultraviolet photomicrography technique it has been demonstrated that 2-amino-1,3,3-tricyano-2-propene administered intravenously to rabbits at doses of 4–5 mg./kg. produces cytological changes in neuronal tissues. Tissue specimens taken one hour after drug injection showed marked increases in protein and nucleoprotein as determined by increased ultraviolet absorption in the cytoplasm and nucleus. This response to the essential active ingredient of the novel compositions occurred in the cells of the dorsal root ganglia, anterior horn cells of the spinal cord, Purkinje cells of the cerebellum, and pyramidal cells of the frontal cortex. While the ribonucleic acid content of neurons increased that of the associated oligodendroglia decreased. Accompanying alterations of base ratio also occurred.

The compositions and methods have been found to augment neuromuscular transmission. Although the mechanism of this augmentation is not thoroughly understood, it is thought that neuromuscular transmission at the motor end plate is facilitated.

It has been discovered that oral administration of the essential active ingredient of the novel compositions, i.e., 2-amino-1,3,3-tricyano-2-propene, results in quite rapid absorption and provides demonstrable blood levels of the active ingredient. Serum levels of the active ingredient in rabbits receiving 50 milligrams per kilogram of body weight, by oral administration of an aqueous solution, were as follows:

| Time after administration | 2-amino-1,3,3-tricyano-2-propene, micrograms per milliliter | |
|---|---|---|
| 1 hour | 14.3 | 50.7 |
| 2 hours | 26.8 | 46.6 |
| 4 hours | 18.3 | 29.2 |
| 6 hours | 13.2 | 15.4 |
| 8 hours | 8.1 | 7.0 |

Toxicological studies of 2-amino-1,3,3-tricyano-2-propene have shown the following results:

|  | Mg./kg. |
|---|---|
| Acute $LD_{50}$ in mice, intraperitoneally | 140 |
| Acute $LD_{50}$ in rats, orally | 185 |
| Acute $LD_{50}$ in rats, intraperitoneally | 75 |

Subacute toxicity studies in dogs were carried out by oral administration to groups of 3 dogs in doses of 12.5, 25 and 50 mg./kg. per day. Another group of 3 dogs served as controls. Observations were made daily and body weights were recorded weekly. Pretreatment and terminal pathology included hemograms, urinalysis, blood chemistry, and function studies. The data on blood chemistry, urinalysis, and liver function tests were within normal limits. At necropsy the animals were examined for gross pathological alterations. Organ weights were recorded and histological examination was made on tissue from the adrenals, kidneys, thyroids, testes or ovaries, liver, spleen, prostate, heart, brain, pituitary, mandibular salivary gland, stomach, duodeum, ileum, urocyst, thymus, epididymis, uterus, pancreas, aorta, bone marrow, mesenteric and bronchial lymph nodes, skeletal muscle, eye, lung, skin, jejunum, cecum, colon, rectum and mammary gland. The compound was relatively nontoxic at the dose levels administered.

It has been discovered that the novel compositions demonstrate beneficial effects in the treatment of certain neurological afflictions, for example, in nerve trauma, by hastening nerve regeneration.

Injectable dosage forms can also be compounded. Such forms containing from about 0.2 to about 20% by weight of the 2-amino-1,3,3-tricyano-2-propene are beneficial in the treatment of animals, especially those having a neurological deficit. The injection of 1 to 2 milliliters daily provides an effective dose. Favorable effects on learning time and retention are obtained.

The dosage of compositions containing 2-amino-1,3,3-tricyano-2-propene and one or more other active ingredients is to be determined with reference to the usual dosage of each such ingredient.

The following examples are illustrative of the preparation of selected dosage unit forms of the compositions of the present invention but are not to be construed as limiting.

EXAMPLE 1

*Tablets (125 milligrams)*

To prepare 1000 tablets (125 milligrams), 500 grains of talc is added to 100 grains of calcium stearate, and the resulting mixture is slugged together with 125 grams of 2-amino-1,3,3-tricyano-2-propene. The slugs are reduced to granules through a 14-mesh screen. A lactose granulation is prepared from 2400 grains of lactose, 50 grains of starch and 50 grains of sucrose, the latter two constituting the granulating paste. The 2-amino-1,3,3-tricyano-2-propene and lactose granulations are mixed, 250 grains of talc and 100 grains of calcium stearate are added, and the resulting mixture is compressed into tablets, each tablet containing:

| | | |
|---|---|---|
| 2-amino-1,3,3-tricyano-2-propene | mg | 125 |
| Talc | gr | 0.75 |
| Calcium stearate | gr | 0.2 |
| Lactose | gr | 2.4 |
| Starch | gr | 0.05 |
| Sucrose | gr | 0.05 |

Scored tablets, each containing 200 mgs. of 2-amino-1,3,3-tricyano-2-propene and prepared in like manner also provide a beneficial dosage form.

EXAMPLE 2

*Hard-gelatin capsules (500 milligrams)*

Ten thousand two-piece hard gelatin capsules for oral use, each containing 500 milligrams of 2-amino-1,3,3-tricyano-2-propene, are prepared from the following types and amounts of materials.

| | |
|---|---|
| 2-amino-1,3,3-tricyano-2-propene | 11 lb. 1 oz. 258 gr. |
| Corn starch | 3 lb. 9 oz. |
| White mineral oil, U.S.P. | 4 oz. 250 gr. |
| Magnesium stearate, powder | 5 oz. 313 gr. |
| Talc, U.S.P. | 5 oz. 313 gr. |

The finely powdered ingredients are mixed thoroughly and then encapsulated in the usual manner.

Similarly, capsules each containing 1 milligram of reserpine in addition to the 2-amino-1,3,3-tricyano-2-propene are prepared by inclusion of 10 grams of reserpine in the above formulation.

EXAMPLE 3

*Soft-gelatin capsules (250 milligrams)*

One-piece soft gelatin capsules for oral use, each containing 250 milligrams of 2-amino-1,3,3-tricyano-2-propene, are prepared by first dispersing the compound in sufficient corn oil to render the material capsulatable and then encapsulating in the usual manner.

EXAMPLE 4

*Syrup*

A sugar-free syrup for oral use containing in each five milliliters 750 milligrams of 2-amino-1,3,3-tricyano-2-propene is prepared from the following types and amounts of materials:

| | | |
|---|---|---|
| 2-amino-1,3,3-tricyano-2-propene | gm | 1500 |
| Methylparaben, U.S.P. | gm | 7.5 |
| Propylparaben, U.S.P. | gm | 2.5 |
| Saccharin sodium | gm | 12.5 |
| Ascorbic acid | gm | 10.0 |
| Cyclamate sodium (sodium cyclohexyl sulfamate) | gm | 2.5 |
| Glycerin | ml | 3000 |
| Tragacanth powder | gm | 10 |
| Orange oil flavor | gm | 10 |
| F.D.C. orange dye | gm | 7.5 |
| Deionized water, q.s. to 10,000 ml. | | |

The foregoing composition may also be compounded in the usual manner to contain 600 grams of 2-amino-1,3,3-tricyano-2-propene and 600 grams of ectylurea to give in each five milliliters 300 milligrams of ectylurea together with 300 milligrams of the essential active ingredient.

EXAMPLE 5

*Elixir*

An elixir for oral use, containing in each five milliliters 500 milligrams of 2-amino-1,3,3-tricyano-2-propene, is prepared from the following types and amounts of materials:

| | |
|---|---:|
| Saccharin sodium _____gm__ | 125 |
| Cyclamate sodium _____gm__ | 25 |
| Sucrose _____gm__ | 3000 |
| 2-amino-1,3,3-tricyano-2-propene _____gm__ | 1000 |
| Alcohol, 95% _____ml__ | 1500 |
| Propylene glycol _____ml__ | 1000 |
| Sodium metabisulfite _____gm__ | 10 |
| F.D.C. red dye _____gm__ | 10 |
| Cherry flavor _____gm__ | 10 |
| Deionized water, q.s. to 10,000 ml. | |

EXAMPLE 6

*Injectable preparation, aqueous*

A sterile aqueous preparation suitable for intravenous or intramuscular injection and containing 25 milligrams of 2-amino-1,3,3-tricyano-2-propene and 1 milligram of sodium bisulfite in each milliliter is prepared from the following types and amounts of materials:

| | Gm. |
|---|---:|
| Sodium bisulfite _____ | 1 |
| 2-amino-1,3,3-tricyano-2-propene _____ | 25 |
| Preservative _____ | 3 |
| Water for injection, q.s. to 1000 ml. | |

The injection of one to two milliliters, one to two times daily, constitutes effective treatment to remedy neurological deficits, especially trauma-induced deficits.

Intracarotid infusion at a dosage of 1 to 20 mg. per kilo of body weight constitutes beneficial therapy in retarding gliosis associated with glioblastoma.

EXAMPLE 7

*Injectable preparation, oil*

A sterile oil preparation suitable for intramuscular injection and containing 200 milligrams of 2-amino-1,3,3-tricyano-2-propene in each milliliter is prepared as follows:

A mixture of 2 grams aluminum monostearate and 98 milliliters of peanut oil is slowly heated with stirring to a temperature of 100° C. The temperature is maintained at this level for one hour (when gelling is complete) and is then raised to 150° C. for one additional hour. The gel is then cooled and 20 grams of sterile 2-amino-1,3,3-tricyano-2-propene is incorporated aseptically, with stirring, in 80 milliliters of the gel. The total volume is made up to 100 milliliters by addition of gel, with further stirring.

What is claimed is:

A method of increasing the nucleoprotein content of neural cells, promoting regeneration of neural tissue and augmenting neuromuscular transmission which comprises the systemic administration to mammals having traumatized nerves of an effective unitary dosage of a pharmaceutical composition consisting essentially of 2-amino-1,3,3-tricyano-2-propene.

References Cited by the Examiner

Ingbar: J. of Clin. Endocrin. and Metal., vol. 21, pp. 128–139, February 1961.

Miller: Proc. Soc. Exptl. Biol. Med., vol. 107, No. 3, pp. 585–139, July 1961.

ALBERT T. MEYERS, *Primary Examiner.*

S. J. FRIEDMAN, *Assistant Examiner.*